United States Patent
Jacyno

[15] 3,685,843
[45] Aug. 22, 1972

[54] INSULATED CHUCK
[72] Inventor: Anthony Jacyno, Aurora, Ill.
[73] Assignee: G. W. Murphy Industries, Inc., Portable Electric Tools Division
[22] Filed: Jan. 12, 1970
[21] Appl. No.: 2,333

[52] U.S. Cl...............279/1 R, 174/138 D, 279/1 Q, 310/50, 408/710
[51] Int. Cl. ............................................B23b 31/04
[58] Field of Search...........279/1, 1 R, 60, 1 Q; 77/7, 77/6; 310/50; 174/138 D

[56] References Cited

UNITED STATES PATENTS

| | | |
|---|---|---|
| 3,242,998 | 3/1966 | Gubbins..................310/50 X |
| 2,281,218 | 4/1942 | Windsor..........................77/6 |
| 3,457,438 | 7/1969 | Badcock....................310/50 |
| 648,174 | 4/1900 | Meyrowitz.............174/138 D |

*Primary Examiner*—Andrew R. Juhasz
*Assistant Examiner*—James F. Coan
*Attorney*—Hofgren, Wegner, Allen, Stellman & McCord

[57] ABSTRACT

An insulated chuck is provided for a motor driven tool such as a portable electric drill. The chuck can be mounted on a spindle driven by the motor of the drill and its tool holding jaws separated from the motor driven spindle by an electrical insulating member which blocks passage of electrical current between the tool holding jaws of the chuck and the motor and/or user. In the preferred form as described, the insulating member is integrally molded partly within a receiver opening toward the proximal end of the chuck and the member completely surrounds the threaded end of the motor driven spindle. The insulating member extends to the outermost edge of the chuck at the proximal or spindle receiving end thereof and is internally threaded to receive the spindle. The insulating member includes a locking ring portion extending into an annular groove in the receiver wall and radial locking ribs for locking the member against axial or rotational movement relative to the remainder of the chuck. A steel nut is imbedded and locked in and surrounded by the insulating material at the proximal end of the chuck with the threads of the nut contiguous with threads in the insulating material.

17 Claims, 4 Drawing Figures

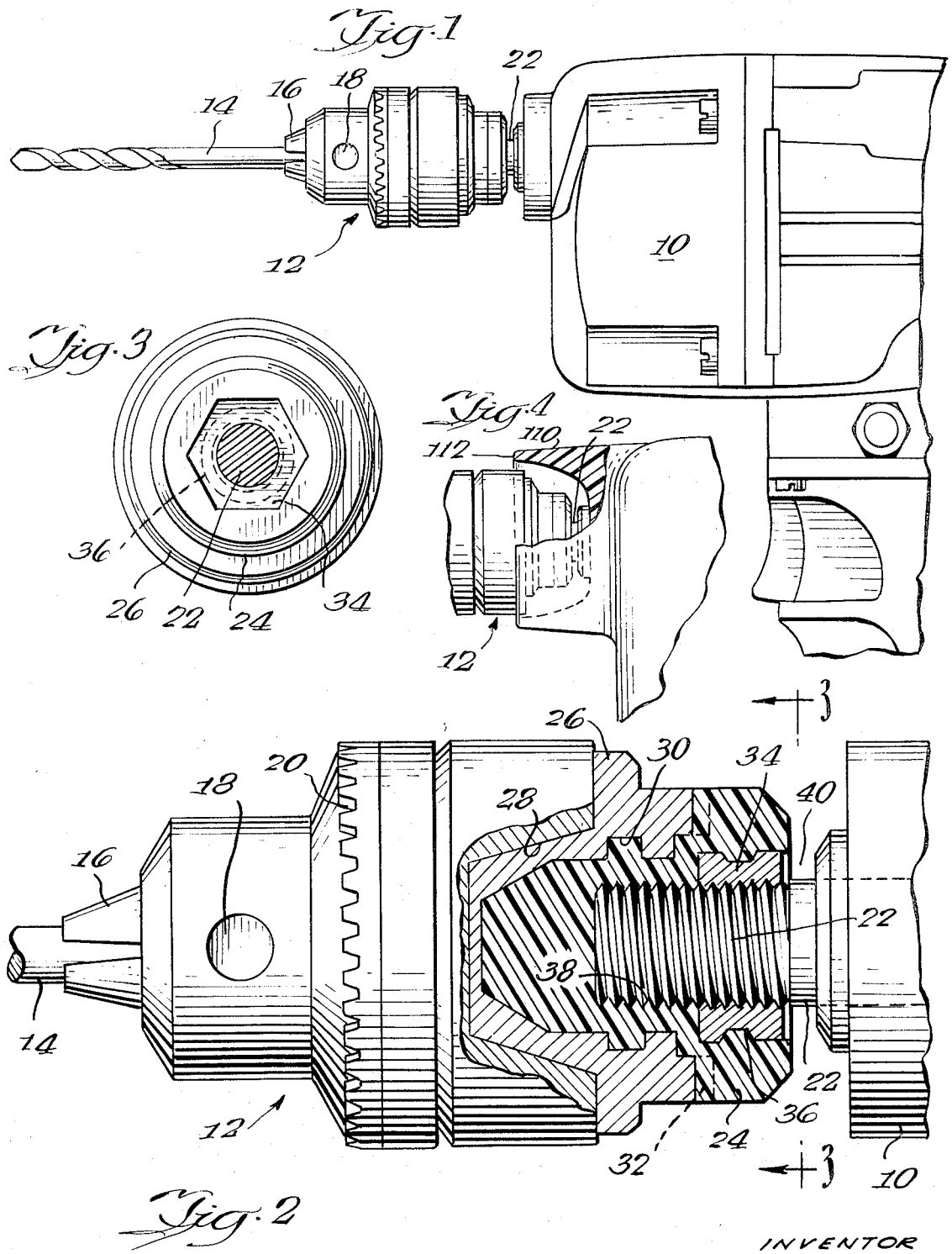

INSULATED CHUCK

BACKGROUND OF THE INVENTION

1. Field of the Invention

This invention relates to chucks for motor driven tools and also to the prevention of flow of electric current between the tool holding portion of the chuck and the motor or user.

2. Description of the Prior Art

Electric tools and especially portable electric tools are often used under circumstances where the working part, e.g., a drill bit held by the chuck jaws is apt to contact a source of electricity. Such a power source might be the power cord of the tool, a wire between studs in a wall, or the like. Thus, provision has been made to prevent flow of electricity between the chuck and the electric motor or between the chuck and the user of the tool. Many such provisions have been fairly expensive in design. One solution has been to provide insulating materials in critical portions of the tool as a way of eliminating the direct flow of electricity through the chuck to the motor or user. For example, in U.S. Pat. No. 2,281,218, insulating rubber belts are used in the drive system but these belts are much more likely to fail through wear than is a gear train or other drive system made of conductive metal parts. As another example, in U.S. Pat. No. 3,242,998, the spindle itself is made of insulating material. Other tools try to circumvent the problem of shock to the user solely by the use of insulating plastic housings.

SUMMARY OF THE INVENTION

Briefly, the present invention provides a chuck for use on a motor driven power tool in which insulating material is included in the chuck for blocking flow of electricity or even spark jump between the chuck and the motor spindle. The insulating material prevents shock to the user and possible damage to the motor when the chuck held working tool contacts an outside source of electricity. Where the tool housing is made of conductive metal, flow of electricity and spark jump from the chuck to the housing is also prevented. In a preferred form where a nonconductive housing is used for the tool, the user is also insulated from electric shock which may result from failure of internal insulation of the tool.

While this invention is susceptible of embodiment in many different forms, there is shown in the drawings and will herein be described in detail embodiments of the invention with the understanding that the present disclosure is to be considered as an exemplification of the principles of the invention and is not intended to limit the invention to the embodiments illustrated.

BRIEF DESCRIPTION OF THE DRAWINGS

FIG. 1 is a side plan view of an electric drill equipped with the preferred form of insulating chuck of this invention;

FIG. 2 is an enlarged side plan view and partial section of the chuck of FIG. 1;

FIG. 3 is an enlarged view of the distal end of the chuck of FIG. 1; and

FIG. 4 is a reduced size broken away view of a modified form of housing configuration.

DESCRIPTION OF THE PREFERRED EMBODIMENTS

The insulating chuck of the present invention can be used with a wide variety of motor driven power tools. Such tools include electric screw drivers, electric drills, impact wrenches or the like, usually driven by an electric motor mounted in a housing, as is common with portable electric tools.

The insulating material is provided between the chuck jaws at the distal end of chuck and the spindle at the proximal end. In the preferred form the insulating material extends the width of the chuck at the proximal end thereof for preventing spark jump between the chuck and the spindle, or the housing where an electrically conductive housing is used. Also where conductive housings are used an appreciable air space is preferably provided between the chuck and housing to further minimize chances of spark jump from the chuck to the housing. Usually a nonconductive housing is provided for extra protection of the user from possible shock resulting from failure of electrical insulation within the tool itself.

Turning now to the drawings, FIG. 1 illustrates a chuck 12 mounted on a portable electric drill. The drill has a nonconductive high impact resistant plastic housing 10 which contains, among other components, the electric motor wiring, and a suitable drive train for driving the spindle to which chuck 12 is secured. A working tool such as a drill bit 14 is held by jaws 16 in the chuck and the normal key port 18 and key ratchet 20 are provided for opening and closing jaws 16 to replace drill bits.

As best seen in FIGS. 2 and 3, the electric drill has a threaded steel spindle 22 on which the chuck 12 is received. Accordingly, at the proximal end of chuck 12 there is provided an integrally molded electrically insulating member 24 having a female threaded portion for receiving spindle 22 and for insulating spindle 22 from steel portion 26 of chuck 12. Steel portion 26 is provided with receiver 28 having an annular groove 30 in the receiver wall and having radial grooves 32 extending a short distance axially at the receiver lip. A threaded metal member, e.g., steel nut 34, is imbedded in and received with the insulating member on the spindle and includes a peripheral groove 36 which receives an inwardly raised ring portion of insulating member 24. The threads of nut 34 are contiguous with the threads of insulating member 24.

Insulating member 24 can readily be provided by molding it in place within receiver 28 using a cooperating mold portion to form that part of the insulating member which projects from the proximal end of receiver 28. During molding, the nut 34 can be positioned on a threaded release-coated core member the shape of central bore 38 and, after the plastic is set, the core member can be removed leaving nut 32 in proper position. It will be apparent that during molding the plastic material will flow into annular groove 30 to form an outwardly projecting locking ring and will also flow into groove 36 of nut 34 to provide an inwardly projecting locking ring for the purpose of more securely locking the nut 34, member 24 and steel portion 26 against axial movement relative to each other. Additionally, plastic material will fill radial grooves 32 in the form of radial ribs spaced around steel portion 26 at the lip of receiver 28 to lock steel portion 26 and insulating member 24 against rotational movement relative to each other. The corners of nut 34 project into the plastic material of member 24 to prevent relative rotational movement between nut 34 and member 24. Thus, elements 24, 26 and 28 are locked as a unitary structure against rotational or axial movement relative to each other. It is within the scope of my invention to shape the inside configuration of the steel portion 26 hexagonal or of another uneven cross-section so as to further key the insulating member 24 and nut 34 against relative rotation.

Nut 34 assures proper starting of threading of the spindle into insulating member 24 and prevents possible thread stripping which might occur if the less durable plastic material were used at the entry of the spindle receiving bore 38. Further, the nut serves to strengthen the insulating member 24.

It will be noted that the nonconductive material of member 24 extends to the periphery of the chuck at the proximal end thereof to decrease the chance of spark jump from steel portion 26 to spindle 22. Further, an air gap indicated by reference numeral 40 can be provided between the chuck and housing to further minimize spark gap jump, especially to a conductive housing.

As shown in FIG. 4, a housing 110 is illustrated made of insulating material and having an integrally formed forwardly extending shroud 112 which encircles the spindle 22 as it exits from the housing and it also overlaps and encircles a small rear section of the chuck 12. The shroud 112 adds further protective spark and electrical conductive protection between the chuck and the conductive parts of the tool.

While illustrative embodiments of the invention are shown and are described in detail with reference to the drawings herein, the invention is susceptible of embodiment in many different forms, and it should be understood that the present disclosure is to be considered as an exemplification of the principles of the invention and is not intended to limit the scope of the embodiments described.

I claim:

1. In a power tool having a housing and including a motor driven spindle of electrically conductive material for rotatably driving a chuck, a chuck comprising means for releasably receiving and securely holding a tool at its distal end to be rotated with the chuck and insulating means in the chuck and immovably affixed thereto for rotation therewith for electrically insulating said tool holding means from the spindle.

2. The device of claim 1 wherein said insulating means extends the width of the chuck to the outer edge of the chuck at the proximal spindle receiving end thereof for preventing spark jump between the chuck and spindle.

3. The device of claim 2 wherein the power tool includes an electric motor.

4. The device of claim 3 wherein said tool is a portable tool.

5. In a power tool having a housing and including a motor driven spindle of electrically conductive material for driving a chuck, a chuck comprising means for releasably receiving and securely holding a tool at its distal end to be rotated with the chuck and insulating means in the chuck for electrically insulating said tool holding means from the spindle, said insulating means extending the width of the chuck to the outer edge of the chuck at the proximal spindle receiving end thereof for preventing spark jump between the chuck and spindle, said power tool being a portable tool and including an electric motor, and means establishing an air gap between the chuck and tool housing.

6. The device of claim 4 wherein said portable tool is a portable electric drill.

7. In a power tool having a housing and including a motor driven spindle of electrically conductive material for driving a chuck, a chuck comprising means for releasably receiving and securely holding a tool at its distal end to be rotated with the chuck and insulating means in the chuck for electrically insulating said tool holding means from the spindle, said insulating means extending the width of the chuck to the outer edge of the chuck at the proximal spindle receiving end thereof for preventing spark jump between the chuck and the spindle, the insulating means being a member in a receiver of the chuck and extending from the receiver to define the proximal end of the chuck and including a metal female threaded male member embedded in and surrounded by the insulating member.

8. The device of claim 7 wherein the imbedded metal member is generally flush with the insulating material at the proximal end of the chuck for assisting in starting threading of the chuck on the spindle properly and without stripping of threads.

9. The device of claim 8 wherein the threads of the metal member extend contiguously with female threads in the insulating member and the insulating member completely surrounds the spindle and extends between the imbedded metal member and the remainder of the chuck and is coextensive with the outer edge of the chuck at the proximal end thereof.

10. The device of claim 9 wherein said insulating member includes an integral outwardly projecting ring portion received in a groove in the wall of the insert receiver for assisting in preventing axial movement of the insulating member relative to the electrically conductive portion of the chuck.

11. The device of claim 10 wherein the insulating material of the insulating member extends into a peripheral groove in the imbedded metal member to assist in preventing axial movement of the imbedded metal member relative to the insulating member.

12. The device of claim 11 wherein said insulating member includes radial projections received in radial grooves of the electrically conductive portion of the chuck for locking against relative rotation between the conductive metal portion and the insulating member.

13. The device of claim 7 wherein the imbedded metal member is a nut having corners imbedded in the insulating material and inhibiting relative movement of the nut and insulating material.

14. The device of claim 7 wherein said insulating member comprises a plastic member molded in situ within the receiver.

15. The device of claim 7 wherein said insert and insulating member are locked together against relative rotational and axial movement.

16. In a power tool having a housing and including a motor driven spindle of electrically conductive material for driving a chuck, a chuck comprising means for releasably receiving and securely holding a tool at its distal end to be rotated with the chuck and insulating means in the chuck for electrically insulating said tool holding means from the spindle, said insulating means including means for locking itself to an electrically conductive jaw bearing portion of the chuck and against axial and rotational movement relative to said conductive portion.

17. The device of claim 1 wherein the tool housing contains an electric motor and suitable wiring and the housing is of electrically nonconductive material.

* * * * *